Jan. 22, 1963 B. T. MARTINS 3,074,221
POWER LAWNMOWER
Filed June 27, 1961 2 Sheets-Sheet 1

INVENTOR.
BENJAMIN T. MARTINS.
BY
Robert A. Sloman
ATTORNEY

Jan. 22, 1963   B. T. MARTINS   3,074,221
POWER LAWNMOWER
Filed June 27, 1961   2 Sheets-Sheet 2
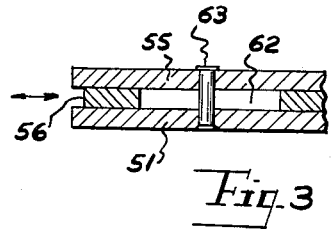
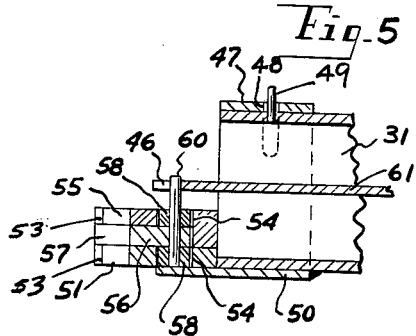
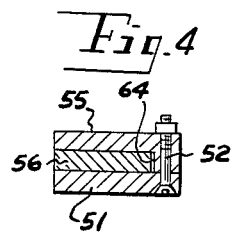
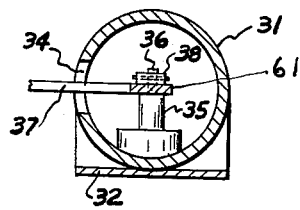
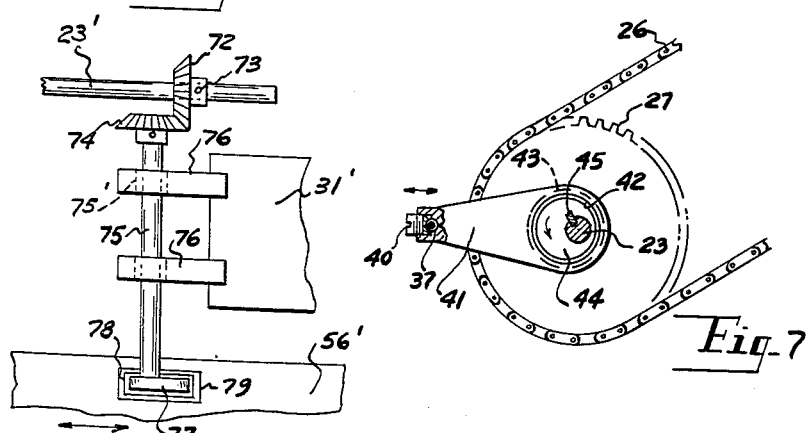
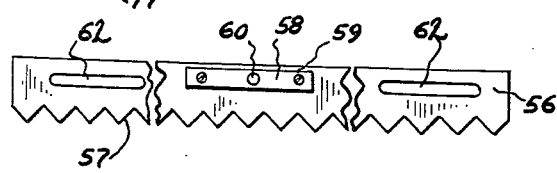
INVENTOR.
BENJAMIN T. MARTINS
BY
Robert A. Sloman
ATTORNEY 3,074,221
POWER LAWNMOWER
Benjamin T. Martins, Detroit, Mich.
(10681 Katherine St., Taylor, Mich.)
Filed June 27, 1961, Ser. No. 119,994
3 Claims. (Cl. 56—26.5)

This invention relates to lawnmowers, and more particularly to a power driven lawnmower and wherein the forwardly positioned elongated cutting blade is serrated across its front end and is adapted for transverse reciprocal movements between a pair of supporting guides similarly serrated to provide the shearing action.

It is the object of the present invention to provide an improved power lawnmower including a unit base frame which supports the rear axle, the motor, the transmission mechanism and means for transmitting the power from the transmission to the longitudinally reciprocal cutting blade.

It is a further object of the present invention to provide a novel form of mounting for the cutting blade and the guide mechanism therefor.

It is a further object of the present invention to provide an eccentric or cam drive together with cantilever means for effecting longitudinal reciprocal movements of the cutter blade.

It is a further object of the present invention to provide a cutting blade mounting means by which the said cutting blade may rotate upon a horizontal axis to compensate for irregularities in the ground surface.

These and other objects will be seen from the following specification and claims in conjunction with the appended drawings in which:

FIG. 3 is a fragmentary section taken on line 3—3 of FIG. 1, on an increased scale.

FIG. 4 is a transverse section taken on line 4—4 of FIG. 1, on an increased scale.

FIG. 5 is a transverse section taken on line 5—5 of FIG. 1, on an increased scale.

FIG. 6 is a section taken on line 6—6 of FIG. 1, on an increased scale.

FIG. 7 is a transverse section taken on line 7—7 of FIG. 1, on an increased scale.

FIG. 8 is a plan view of the lawnmower blade.

Figure 1:
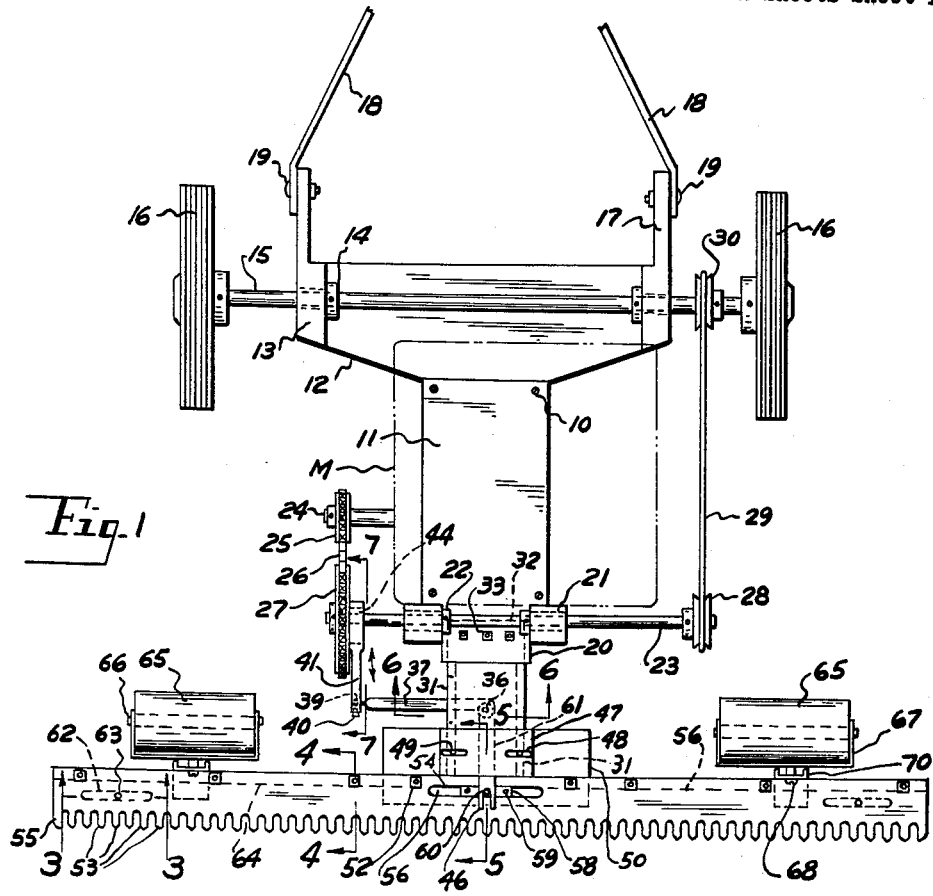
FIG. 1 is a fragmentary plan view of the present power lawnmower.

FIG. 9 fragmentarily shows a different form of power transmission.

It will be understood that the above drawings illustrate merely a preferred embodiment of the invention and that other embodiments are contemplated within the scope of the claims hereinafter set forth.

Referring to the drawings, the present power lawnmower includes a base frame 11 having a transverse rear portion, or mounting plate 12 with upstanding bosses 13, receiving bearings 14, which journal the rear axle 15 carrying at its ends the rubber tired wheels 16.

The bosses 13 also include the rearwardly extending arms 17 to which the lower ends of the lawnmower handle members 18 fragmentarily shown, are secured as by the fasteners 19.

Base frame 11 also has a forwardly extending support plate 20 as a part thereof and upon opposite sides of said plate, the upstanding bosses 21 transversely apertured to receive the bushings or bearings 22 through which is journaled the driven shaft 23, suitably retained against endwise movement.

A suitable motor M, such as an internal combustion engine, or an electric motor, as desired, is positioned over the central portion of the base frame 11 and fixedly secured thereto as by the fasteners 10 and includes the driveshaft 24 carrying sprocket 25 connected by a chain 26 to sprocket 27 secured on the driven shaft 23.

A pulley 28 secured on the opposite end of drivenshaft 23 is connected by belt 29 to the second pulley 30 keyed or otherwise suitably secured to the axle 15 for driving same.

The horizontally disposed forwardly extending cylindrical housing 31 has fixedly secured thereunder the plate 32 which extends rearwardly of the said housing as at 32 and underlies the plate extension 20 forming a part of the base frame and is fixedly secured thereto by a series of fasteners 33, to thus provide a rigid mounting for the housing 31, which mounts the control mechanism for the transversely adjustable cutting blades 56, hereinafter described.

Housing 31 has a transverse elongated slot 34 in one side wall thereof, as shown in FIG. 6, and adjacent said slot there is a pedestal support 35 on the interior of the housing, having a mounting pin 36 axially positioned at its upper end to pivotally mount for rotation in the horizontal plane the cantilever 37—61, shown in FIGS. 1, 2, 5 and 6.

Said cantilever is retained thereon as shown in FIG. 6 by the retainer washer 38 and associated cotterpin, or equivalent structure. The one end 37 of said cantilever pivotally mounted for reciprocal movement in a horizontal plane within housing 31 projects outwardly of the slot 34, FIGS. 1 and 6, and is flexibly connected as at 39 by a ball and socket connection including a set screw 40 to the forward end of the connecting rod 41. FIGS. 1 and 7.

The enlarged rear end portion of said connecting rod is curved and has a circular aperture 42 therethrough within which is mounted and nested the bearing 43 adapted to loosely receive the eccentric or cam 44, keyed at 45, to the driven shaft 23, FIGS. 1 and 7. Accordingly, and in the manner hereinafter described, rotation of the cam 44 through the operation of the driven shaft 23 will effect forward and rearward reciprocal movements of the connecting rod 41 and corresponding tilting reciprocal movements of the cantilever 37—61, as hereafter explained.

The other end portion 61, or arm of the above described cantilever, extends axially within the housing 31 and projects outwardly from its outer end and terminates in the fork 46 adapted to loosely receive the upright pin 60, which is connected with the transversely reciprocal blade 56 for effecting reciprocal movements thereof, as hereafter described.

*Support Mechanism for Lawnmower Blade*

A sleeve 47 is rockably mounted and retained over the forward end of housing 31 by means of a pair of radially extending pins 49 which project from the housing 31 and are guidably positioned within a pair of spaced slots 48 formed in side wall portions of sleeve 47. By this construction the sleeve is free for limited rotary movement with respect to the housing 31 and at the same time and by virtue of the pins 49 is retained against endwise or disengaging movement therefrom.

Figure 2:
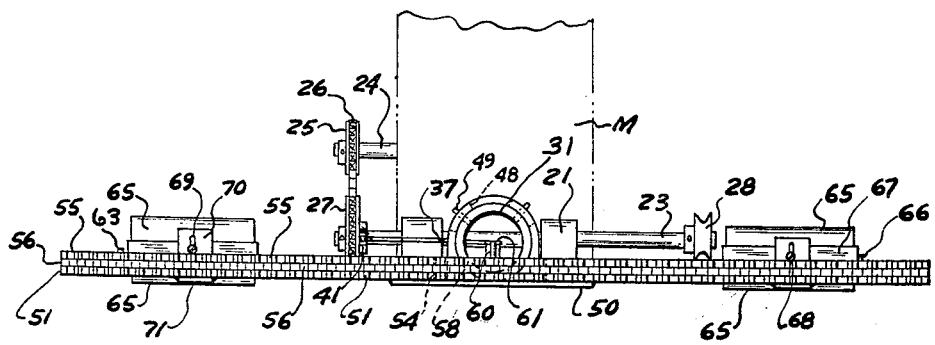
FIG. 2 is a fragmentary front elevational view thereof.

Sleeve 47 has secured to its undersurface, a rectangular mounting plate 50, FIGS. 1 and 5, which projects forwardly of the forward end of the said sleeve so as to supportedly underlie a pair of vertically spaced transversely extended blade guides 51 and 55, whose forward edges are serrated as at 53 for cooperation with the serrations 57 in the leading horizontal edge of the blade 56, as best shown in FIG. 2, and FIG. 5.

Accordingly the blade supports 51 and 55, which extend transversely of the longitudinal axis of the lawnmower are positioned and mounted centrally upon the sleeve 47 to thus provide a tilting support therefor to the extent required in the normal operation of the lawnmower.

The arrangement and construction of the guides 51 and 55 is also shown in FIG. 4, wherein it is seen that the uppermost guide 55 has depending from its rear longitudinal edge the flange 64, which bears against the top surface of the bottom guide 51, and is fixedly secured thereto. As best shown in FIG. 1, the fasteners 52 extend up through forward portions of the support plate 50, and through the respective guides 51—55, by which the said guides are rigidly secured to the support plate 50 and at the same time are secured to each other by the additional fasteners 52, shown in FIG. 4, as well as in FIG. 1, and where it is noted also that the transversely reciprocal elongated cutting blade 56 is supportably positioned so that its rear longitudinal edge slidably and loosely bears against interior surface of the flange 64 which forms a part of the top guide 55, for illustration.

Actually the reciprocal blade is relative thinner than shown in the drawing and in the preferred embodiment may measure .035 inch and be constructed of a suitable hardened steel for this purpose.

Referring specifically to FIG. 5, the central portion of the guides 51 and 55 have opposed vertically spaced slots 54 extending therethrough to loosely and guidably receive the elongated blocks 58, which are arranged upon opposite sides of blade 56 and fixedly secured thereto as by the fasteners 59. Accordingly, it is seen that the central portion of the blade 56, by virtue of the blocks 58, is guidably positioned within the respective guides 51 and 55. At the same time an upright pin 60 is secured through the blade 56 and the respective blocks 58 and projects above the said guides and into the forked end 46 of cantilever arm 61.

As above described, the said cantilever is adapted to reciprocate in the horizontal plane. Accordingly, such reciprocal movements by virtue of the pin 60 and the fork 46 thus transmit to the blade 56 transverse longitudinal movements between the guides 51 and 55.

Additional guide means are provided for the outer end portions of the blade 56. For this purpose the outer end portions of said blade have longitudinal slots 62 therethrough adapted to cooperatively receive the headed upright pins 63 which project downwardly through the respective guides 51 and 55 to thus guide the outer end portions of the blade, and completing the assembly of the blade within the respective guides.

Suitable rollers 65 are provided for supporting outer end portions of the respective guides 51—55, said rollers being indicated as 65 and journaled as at 66 within the bifurcated brackets 67. The bracket 67 is adjustably secured by the fastener 68 and associated slot 69 within the mounting plates 70 which are secured as at 71 to portion of the guides 51 and 55 to thus complete the mounting of the forward end of the lawnmower. In other words, the rear base frame of the lawnmower is supported upon the ground surface by virtue of the wheels 16 on the power driven rear axle 15 whereas the forward end portions of the respective guides 51 and 55 are supported by the transversely spaced rollers 65 which engage the ground surface, and which are vertically adjustable, as desired, for determining the height of the cutting blade 56 with respect to the said ground surface.

In the normal operation of the device, structure of primary importance, in conjunction with the motor upon the base frame, is the power driven shaft 23, which drives the cam or eccentric 44, which in turn effects reciprocal movement of the connecting rod 41. The forward end of the connecting rod is flexibly connected as at 39 to the one arm or one end of the cantilever 37, in turn pivotally mounted at 36 within the housing 31. The other arm 61 of the said cantilever extends axially within the housing 31 and outwardly through the end thereof with its forked end 46 flexibly and loosely connected with the upright pin 60, which is secured to the transversely adjustable blade 56, which is guidably and movably positioned within and between the pair of parallel spaced guides 51 and 55.

Accordingly, the reciprocal movements of the arm 61 of said cantilever in a horizontal plane effect corresponding transverse reciprocal movements of the blade 56, which is guidably mounted as above described within and between the guide plates 51 and 55 to thus achieve the cutting action as the lawnmower is moved forwardly in a reasonably conventional manner.

A slightly different form of power transmission is fragmentarily shown in FIG. 9 wherein the shaft 23' corresponding to the power driven shaft 23 of FIG. 1 has keyed thereon as at 73 the bevel gear 72 which is in mesh with the similar bevel gear 74 suitably secured to the cam shaft 75.

Shaft 75 journaled within suitable bearings 75', carried by the brackets 76, connected with the base frame 31', has secured at its outer end the rotative cam 77. This cam in an arragement similar to that shown in FIG. 7, is loosely positioned within a bearing 78 retained within a circular recess 79 in the transversely reciprocal blade 56', which corresponds in all other respects with the blade 56 shown in FIGS. 2, 3, 5 and 8.

The guide mechanism for the blade is exactly the same as above described, namely the slot 62 and the registering and cooperating pin 63, and portions thereof, as well as some central guide mechanism such as that shown in FIG. 1, FIG. 5, wherein the blocks 58 are secured upon opposite sides of the blade corresponding to that shown in FIG. 8 and wherein the said blocks 58 are guidably positioned within central opposed slots in the corresponding guides 51 and 55.

In operation, the variation shown in FIG. 9 eliminates the use of the connecting rod 41 and the rockable cantilever 37—61. In its place the power driven shaft 23' directly operates the cam shaft 75 and the cam 77, effecting transverse reciprocal movements of the blade 56'.

Having described my invention, reference should now be had to the following claims.

I claim:

1. In a lawnmower having a base frame and a power driven shaft journaled thereon; the improvement comprising a forwardly extending housing secured to said frame, a sleeve rockably mounted and retained on the forward end of the said housing, a mounting plate secured to and projected forwardly of said sleeve, a pair of vertically spaced transversely extending serrated blade guides centrally mounted and secured upon said mounting plate, rollers adjacent and movably supporting opposite ends of said guides, an elongated transversely reciprocal serrated cutting blade interposed and slidably positioned between and cooperable with said guides, cam means on said driven shaft, a cantilever pivotally mounted intermediate its ends within said housing with one end projecting laterally thereof and with its other end projecting axially outward therefrom and loosely connected to said blade, a reciprocal connecting rod at one end loosely receiving said cam means and at its other end flexibly joined to said one end of said cantilever, said housing being horizontally disposed and of cylindrical shape, there being a pair of spaced arcuate slots formed through the wall of said sleeve, and retaining guide pins on said housing projecting radially through said slots respectively.

2. In the lawnmower of claim 1, there being opposed elongated central slots through each of said guides, guide blocks secured centrally upon opposite sides of said blade and movably within said guide slots respectively, there being elongated slots through end portions of said blade, guide pins extending between said guides and loosely through said blade slots, an operating pin secured to said blocks and projecting above said guides, and a fork on the said other end of said cantilever operatively engaging said pin.

3. In the lawnmower of claim 1, an elongated flange extending from the edge of one of said guides throughout its length and bearing against the other guide, said flange adapted to slidably and loosely receive one longitudinal edge of said blade, there being opposed elongated central slots through each of said guides, guide blocks secured centrally upon opposite sides of said blade and movable within said guide slots respectively, there being elongated slots through end portions of said blade, and guide pins extending between said guides and loosely through said blade slots.

References Cited in the file of this patent

UNITED STATES PATENTS

| | | |
|---|---|---|
| 1,610,498 | Duckett | Dec. 14, 1926 |
| 2,110,071 | Pociecha | Mar. 1, 1938 |
| 2,288,498 | Underwood | June 30, 1942 |
| 2,335,541 | Ronning | Nov. 30, 1943 |
| 2,505,296 | Miller | Apr. 25, 1950 |
| 2,692,508 | Orr | Oct. 26, 1954 |